United States Patent [19]

Coe

[11] Patent Number: 5,117,889
[45] Date of Patent: Jun. 2, 1992

[54] COLLAPSIBLE BLIND FOR SEMI-CIRCULAR ARCHED WINDOW

[76] Inventor: David G. Coe, 7108 Hiawassee Bent Cir., Orlando, Fla. 32818

[21] Appl. No.: 564,126

[22] Filed: Aug. 8, 1990

[51] Int. Cl.⁵ .................................................. E06B 3/92
[52] U.S. Cl. ..................................... 160/134; 160/202
[58] Field of Search ................. 160/134, 370.2, 130, 160/166.1, 202

[56] References Cited

U.S. PATENT DOCUMENTS

| | | | |
|---|---|---|---|
| 602,967 | 4/1898 | Wells | 160/134 |
| 1,447,189 | 3/1923 | Simon | 160/134 X |
| 1,450,142 | 3/1923 | Dietrich | 160/134 X |
| 1,464,876 | 8/1923 | King | 160/134 |
| 1,609,877 | 12/1926 | Kendall | 160/134 X |
| 2,153,508 | 4/1939 | Marchbank | 160/134 X |
| 2,306,708 | 12/1942 | Mendel | 160/134 X |
| 3,649,069 | 3/1972 | Zip | 160/134 X |
| 4,606,572 | 8/1986 | Maguire | 160/134 X |
| 4,776,380 | 10/1988 | Lester | 160/134 |
| 4,858,669 | 8/1989 | Vinson | 160/134 |

Primary Examiner—David M. Purol

[57] ABSTRACT

A blind type covering most appropriate to a semi-circular window, constructed of a multible slats, strung together in such a way as to cover a 180° arch when closed, in an even and symmetrical manner. One or two sets of these blades pivot either manually or mechanically from a rigid base attached to or near the window frame. The blades may be composed of virtually any material capable of being self supporting at the lengths necessary, and may also be hollow in nature, allowing for a covering material. By incorporating slots in the blades and a track system, the blades may be pulled out to fully compensate for the irregularities of the arch itself. Further, a quick coupling system may be used to attach the blind to the window, for ease of maintenance.

2 Claims, 6 Drawing Sheets

Fig. 17A
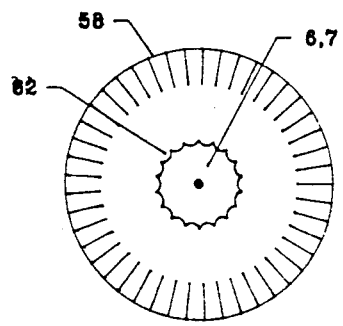
Fig. 17B
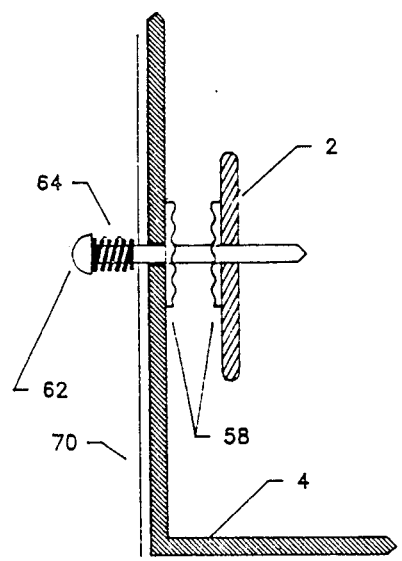
Fig. 18B
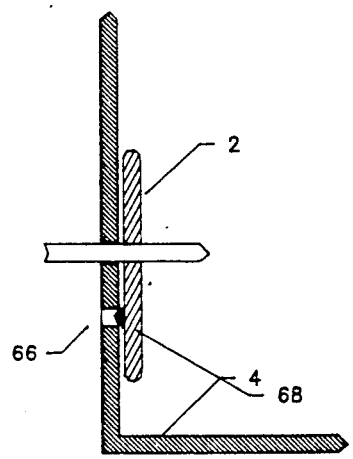
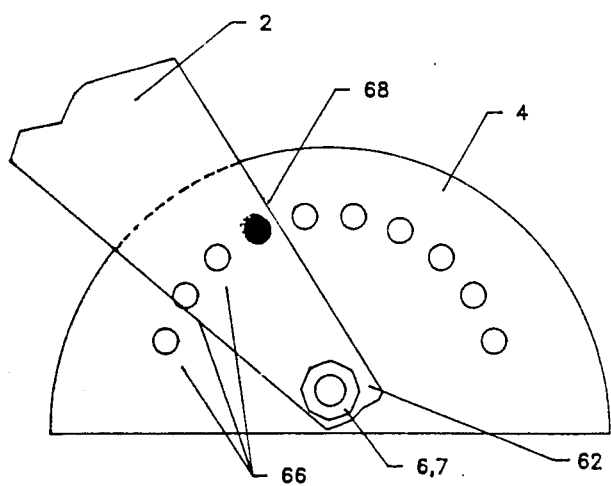
Fig. 18A

COLLAPSIBLE BLIND FOR SEMI-CIRCULAR ARCHED WINDOW

BACKGROUND OF THE INVENTION

This invention is primarily designed to provide an aesthetically pleasing covering for a semi-circular window. Its purpose when closed, is to block out a substantial amount of light and heat from entering the enclosure in which the window is located. Its ability to open and close provides the user with the ability to determine the degree to which this ability is utilized. Its ability to adjust to the irregularities presented by the individual construction of each window is unique, as is the fact that all non-appealing parts (the mechanics) are screened in one way or another.

A functionally desirable device for semi-circular windows is one which is easy to install, simple to utilize, has the ability of having the blades made in a variety of materials, and is, as far as such devices may be, of sufficient strength to withstand years of day to day use and abuse. It should allow for a varied degree of light and heat to be omitted or admitted from the outside. If the blind is to be mechanically operated, then the mechanism should be simple enough in its design to allow for uninterrupted service. If the blind is fully manual, then it should operate in such a fashion as to allow for ease of movement in the blades, and the temporary fixing of their position in their arch.

SUMMARY OF INVENTION

A collapsible blind for a semi-circular window must meet the following criteria: It must cover the whole surface of the widow it is applied to, and must allow for adjustment to any unevenness inherent to that window; It must provide for ease of operation, whether manually or mechanically operated, and this operative movement must be accomplished with a construction of sufficient quality of design and material as to provide years of uninterrupted service; This blind must be aesthetically pleasing to the owner, providing a wide range of blade and facing options from which to choose, and adjust to preference in degree of light and heat admitted or omitted. It must also provide a continuity of lines hitherto unobtainable in earlier designs. Lastly, this blind must be relatively easy to manufacture and to install.

This specific invention comprises all of the requirements as listed above. Because each individual blade is slightly curved at its apex, the basic design allows for a very close fit to the arch of the window. With the added features of the slot and track, this fit is tighter than any previously reached. Due to the fanning operation of either the double or single fan forms (I, II), the simplicity of the design allows for the uninterrupted ease of use sought by the consumer. With the addition of the mechanical option, the consumer needs not even touch the blades to open or close the blinds; And the gearing ratios are so basic that they virtually can never bind up or interrupt service in any way. As for the aesthetics of the blind, it has been designed with the blades closing to the horizontal plane to keep the lines of the fan as neat as possible. The covering plates hiding the mechanisms of the blind merely add to its beauty, and are so designed as to allow for a variety of shapes to be utilized, providing they do in fact meet the minimal covering needs. The blades are designed to offer the consumer a virtually unlimited option as to material and color. The only criteria they must meet is that each blade must be of sufficient strength and durability to support itself. (i.e.—A metal blade need not be as thick as one made out of say, wood.) A quick coupling system allows for ease of maintenance Lastly, as to ease of manufacture and instillation, the number of different parts required are minimal. The rigid base can be molded, the blades stamped out. Construction can be done quickly, in the factory, or on a piece by piece basis by the installer. Installation requires an initial measurement for size, and an actually instillation of a few screws. The consumer could do this himself if desired. With the possibility of a quick connect mounting system, the blind may be removed for ease of maintenance or cleaning.

DESCRIPTION OF THE FIGURES

FIG. 8-b—Illustrates a groove and rivet variation of FIG. 8-a.

FIG. 8-c—Shows a side view of FIG. 8-b.

FIG. 17-a and b—Shows alternate method of causing the partial opening or closing of the blind, using two serrated cams. Front and side views are shown.

FIG. 18-a and b—Illustrates yet another alternate positive locking mechanism for the temporary holding of the blind in a fixed position. Front and side views are shown.

PARTS LIST

2 Blade(s)
3 Solid blade
4 Base
6 Pivot Bolt(s)
7 Pivot Point
8 Nut
10 Spring

12 Hole
14 Slot
16 Handles on Blades
18 Screw Holes in Base
20 Screw(s) for Base
22 Flange on Blade
24 Track
26 Screw(s) for Track
28 Trolly
30 Thread
31 Rivet
32 Thread Holes
33 Slot on Blade for #31
34 Handle on Pivot Bolt
36 Squared Bolt
38 Flanges
40 Gear
42 Gear
44 Gear
46 Bolt for Gear #44
48 Nut for Bolt #46
50 Handles on Gears #42 and #44
52 Handle on Gear #44
54 Hollow Blade
56 Slot in blade #54
58 Serrated Discs
60 Material
62 Spring Loaded Handle
64 Spring
66 Blade Holes
68 Button
70 Covering Device
72 Spring Clip
74 Spring Rivets

SPECIFIC DESCRIPTION OF INVENTION

Figure 1:
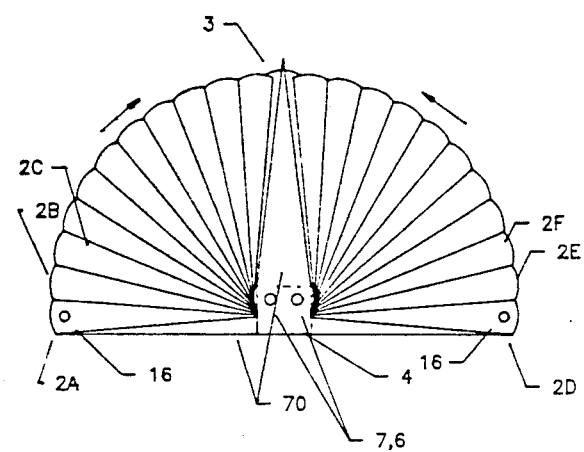
FIG. 1—illustrates double blind in closed position, with covering plate. Also included are optional handles at 2-a, and 2-d.
Figure 3:
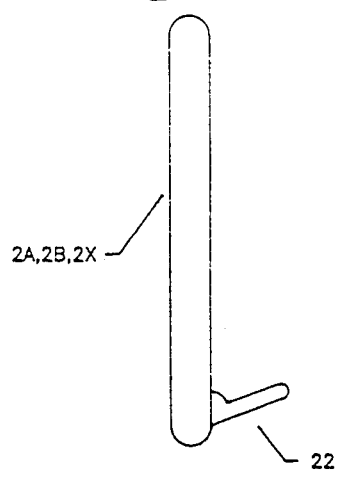
FIG. 3—Figure indicates lip on inner blades used to catch remaining blades as blinds are open.
Figure 4:
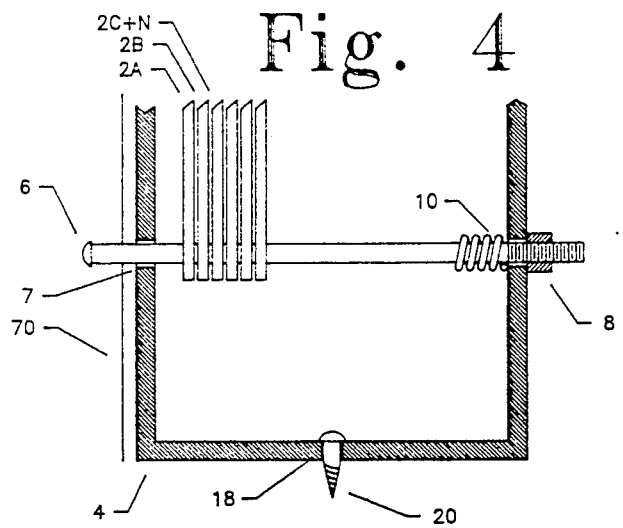
FIG. 4—Illustrates basic mechanism of a pivot point, and rigid support base (side view).
Figure 5:
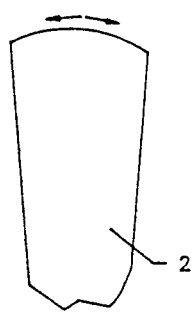
FIG. 5—Shows curvature of blade apex.
Figure 6:
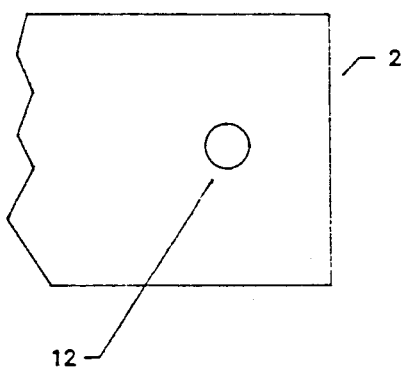
FIG. 6—illustrates basic pivot hole.
Figure 7:
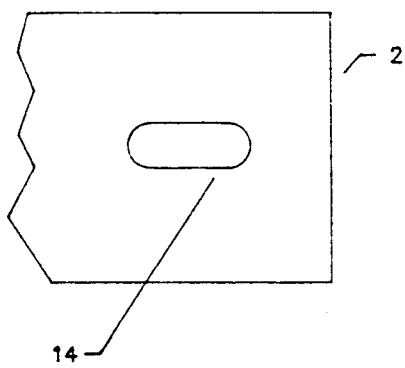
FIG. 7—Illustrates alternate pivot slot.
Figure 19:
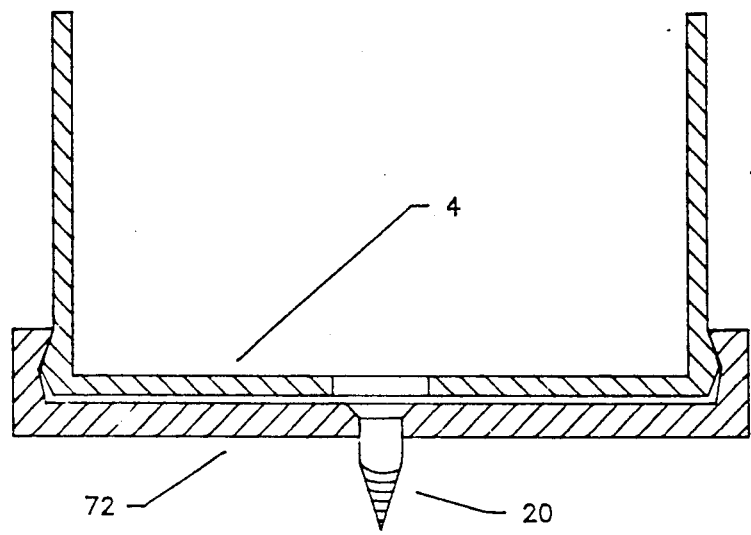
FIG. 19—Shows a modified mounting system for the base of the blind, a quick coupling system.

FIG. 1 shows basic blind fan blades (2-a,b,c,c+N;2-d,e,f,f+n) (Form I) emanating from central pivot point(s) (7), attached to central solid blade (3) in rigid base (4). These blades are in the fully closed position, having begun at the vertical and proceeding to the horizontal. Blades (2-a and 2-d) show optional handles (16) which may be used to accomplish this movement. The blades (2-a,2-d) pivot on bolt(s) (6), utilizing a simple hole (12) (FIG. 6), or a slot (14) (FIG. 7). The blades are optimally each curved at the apex (FIG. 5), for purposes of fit to the curve of the window arch, and for aesthetic reasons. The number of blades varies as to personal preference. FIG. 3 shows an addition (22) on the exterior sides of blades (2-a and 2-d), which catches and forces all other blades to rise when the blades are returned to the vertical position. This feature may be molded in to these specific blades (2-a, 2-b), or affixed at a later time. FIG. 4 illustrates the rigid base (4) held to the frame of the window by screw(s) (20), in hole(s) (18). An alternative method of mounting the base unit is shown in FIG. 19. The base now flairs out at the bottom on both sides, and is held in place by a spring clip (72) mounted to the sill of the window. The spring clip (72) is held by screw(s) 20. The base is shown holding the blades. They are supported on Bolt (6), which runs through the base (4), and is capped by nut (8). A compression device (10) is placed behind the last blade (2-c+n, 2-f+n) to allow for the movement of the blades to a variable predetermined point. This may comprise a spring, rubber grommet, or other such item, and its purpose is to allow the blind to be partially open or closed, (The degree of tightness of the blades on the bolt held between the sides of the base may also allow the blades to operate in this prescribed fashion, and this would be the optimal form, for ease of construction).

FIGS. 17a and b, illustrate a variation of this device which uses two serrated discs (58) which interlock with each other as pressure is applied. The disks are permanently attached to the base (4) and the blade(s) (2-a, 2-d) around the pivot bolt(s) (6). The pressure is obtained through a spring (64) inside a movable handle (62). The handle sits on the main pivot bolt (6), and is permanently attached to the pivot hole (12) or permanently slides in slot (14) at blade (2-a or 2-d). The spring (64) forces compression of the two serrated discs (58) when the handle (62) is at rest. When the handle (62) is compressed inward, the discs (58) are released, and the blade it is attached to (2-a, 2-d) is released The handle (62) may then be used to move the blade(s) to the desired location. FIGS. 18a and b, illustrates another form of a positive locking mechanism. In this form, base (4) has a series of regularly spaced holes (66) drilled in a semi-circular pattern around the pivot point (7). Blades (2-a, 2-d) now have a button or nub (68) permanently affixed to their interior side, which is so placed as to correspond with any specific one of the holes (66) in the base (4) as the blade is moved. This button (68) fits inside the hole (66). Utilizing the same spring (64) and handle (62) described above and illustrated in FIG. 17, the blade(s) (2-a, 2-d) is rotated with the handle (62) to the desired location, and then when the handle (62) is released, the compression given by the spring (64) forces the blade (2-a, 2-d) forward, and the button (68) into one of the drilled holes (66).

In Form I, there are two sets of blades, which overlap from the front (interior side) to the back (window side). Each set encompasses roughly a 90° arch.

In figure two, Form II illustrates a variation of the blind that encompasses a single fan which covers the full 180° of the arch. It may fan from either the left or right of center pivot point (7). It illustrates an optional handle (16) on blade (2-x). In both FIGS. 1 and 2, the covering device (70) is illustrated by the shaded areas. This device (70), which may be of various shapes, has the main purpose in Form I of hiding the meeting point of the two sets of blades, and in form II is more of an aesthetic addition.

Figure 2:
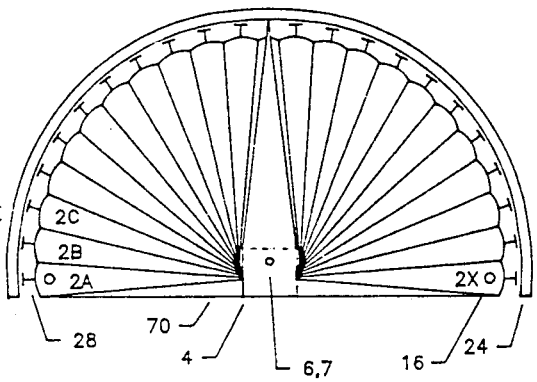
FIG. 2—Shows single blind and basic track arrangement.
Figure 8A:
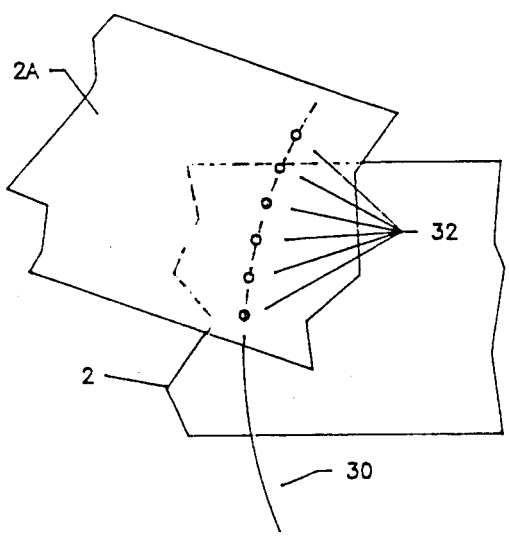
FIG. 8-a—Illustrates basic lock stitching design of thread linking blades, hidden by overlap of next blade.
Figure 8B:
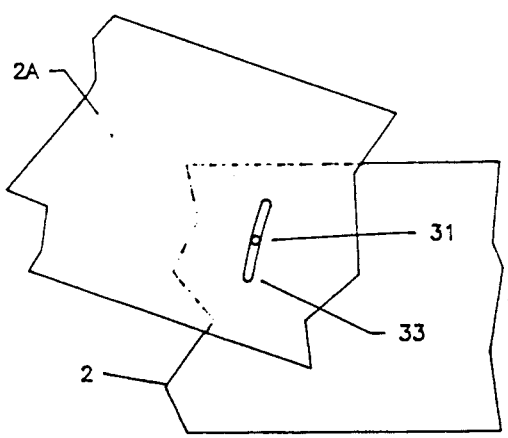
Figure 8C:
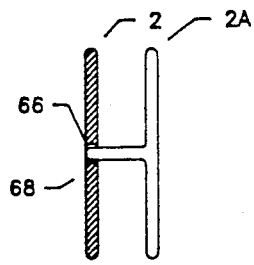
Figure 9:
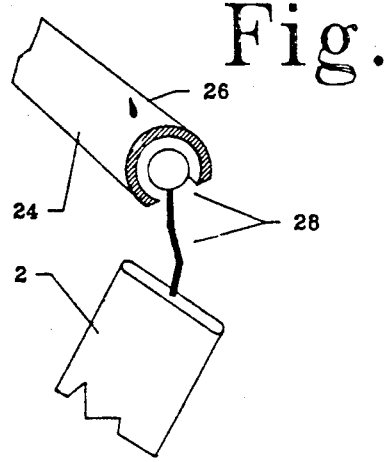
FIG. 9—Portrays an example of a blade trolley inside the arch track.

FIGS. 2 and 9 illustrate the track and trolley system utilized is to cause the blinds to achieve the maximum closeness to the arch of the window. The track (24) is held to the frame of the window arch with screws (26). The trolley (28) is a device which is flexible, with its starting point permanently affixed to the individual blade. The trolley (28) moves freely inside a channel of the track (24), and slides with the movement of the individual blade. The track (24) is constructed of a material sufficiently flexible to be bent to the curve of the arch, most probably a flexible plastic. This whole system allows for the forced extension or compression of the individual blade (2) to the demands of the window's arch, utilizing pivot slot (14), due to the necessity that each arch is constructed separately, and vary as to their perfection of curvature. The individual blades (2) are attached to each other and evenly spaced by the use of a thread (30) interwoven through holes (32) at set intervals in each blade. The spacing of the holes (32) through which this thread (30) is woven allows for the next blade in the series to hide the thread (30) connecting to the previous blade in the series from view (FIG. 8-a). A variation of this system would involve the use of a slot

(33) in each blade instead of the holes (32), into which a rivet (31) is inserted. The rivet (31) is permanently affixed to the prior blade in the series, and moves freely in the slot (33) of the next blade on the series. The rivet (31) therefore replaces the thread (30).

Figure 10:
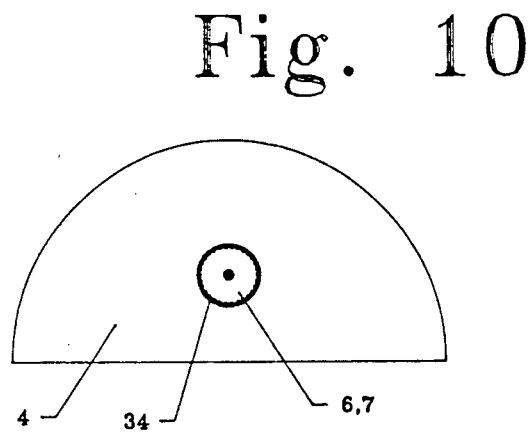
FIG. 10—pictures handle added to single fan form.
Figure 11:
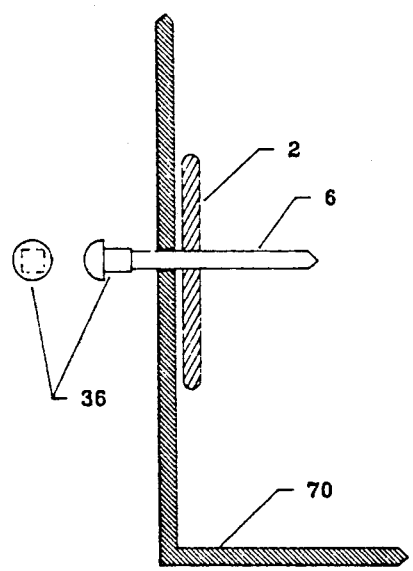
FIG. 11—Illustrate squaring of pivot bolt for mechanical operation.
Figure 12:
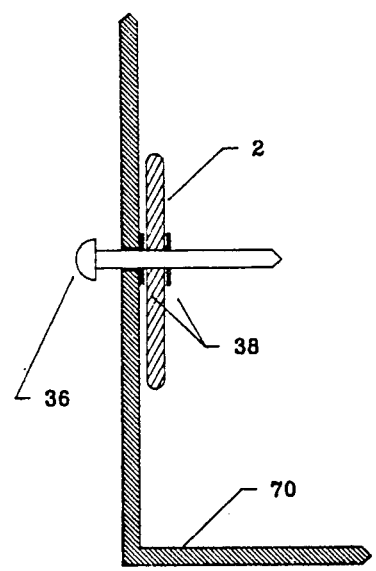
FIG. 12—shows squared pivot bolt with addition of front and back flanges.

FIG. 10 illustrates the addition of a handle (34) at pivot point (7). This alleviates the need for handles on blades (2-a, 2-d). However, in this option, as illustrated in FIGS. 11 and 12, a modification to bolt (6) is required whereby a section of the bolt (6) directly corresponding to the slot in blade (2-a, 2-d, or 2-x), must be squared so as to force the movement of these blades (2-a, 2-b, 2-x), which now makes bolt (36). All other blades will move as previously specified. This squaring of the bolt (36) may be additionally assisted in holding the requisite blades by the addition of flanges, (38) front and back of the blade. These flanges (38) would be larger than the size of the width of the slot (14), thereby preventing the disengaging of the blade (2-a, 2-b, 2-x) from the squared section of the bolt (36).

Figure 13A:
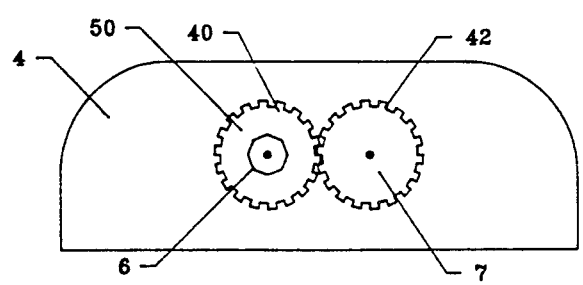
FIGS. 13-a and b,—Shows optional two gear mechanism in front and side view, including alternate handles.
Figure 13B:
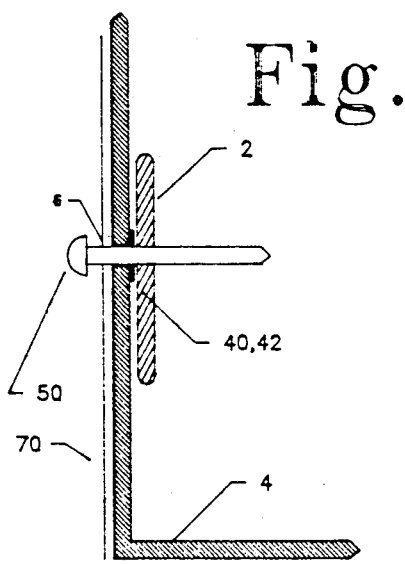
Figure 14A:
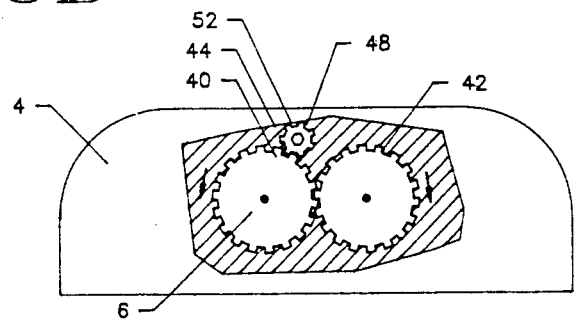
FIG. 14-a and b—Illustrates optional three gear mechanism in front and side view, including alternate handle.
Figure 14B:
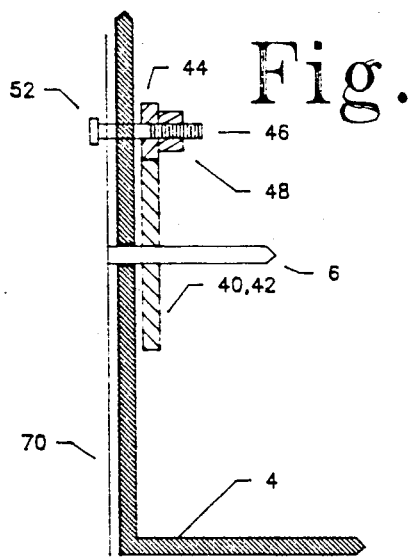
Figure 15:
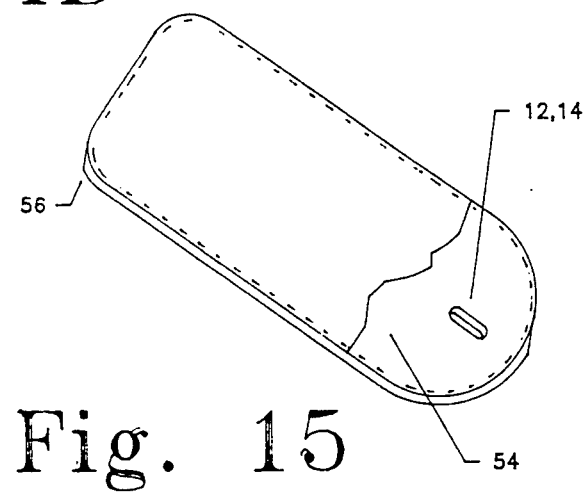
FIG. 15—Illustrated frame for holding cloth blade.
Figure 16:
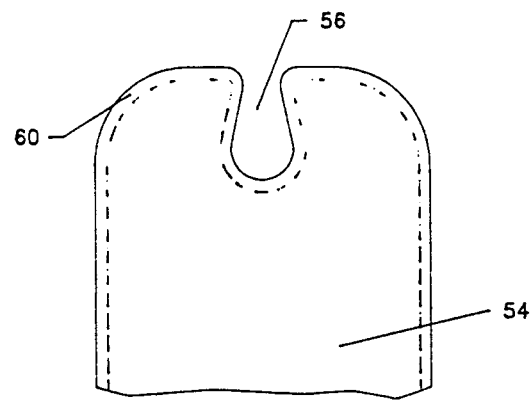
FIG. 16—Illustrates inset method of holding cloth on blade in FIG. 15.
Figure 20:
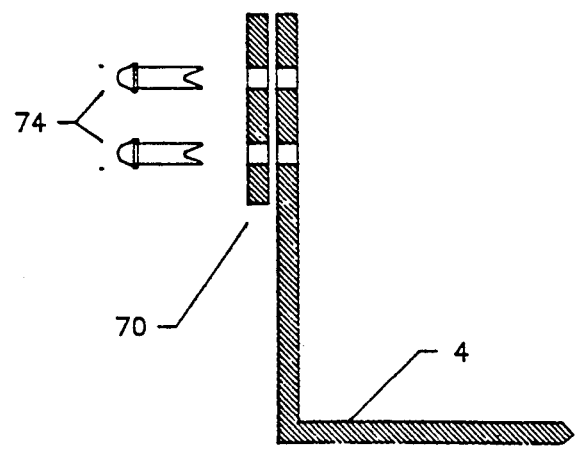
FIG. 20—Illustrates one of the ways the covering face plate may be mounted to the base unit.

FIGS. 13-a and B illustrate the addition of a 1:1 gearing mechanism to form I. These gears (40, 42) would be located on bolt(s) 36, behind the front surface of the rigid support. They would be turned by a handle(s) (50) located on either pivot bolt (36). The two modified systems for temporarily holding the set(s) of blades in a partially open or closed position as previously described (and illustrated in FIGS. 17, and 18), may be adapted to the gearing mechanisms by a)-affixing the serrated discs (58) to the gear(s) (40, and 42) instead of the blades (2-a, 2-d, 2-x), or b)-or by putting the button(s) (68) on the gear(s) (40, and 42) instead of the blades (2-a, 2-d, 2-x). A modification of this mechanical system, is the addition of yet another gear (FIG. 14, part 44) for purely aesthetic reasons. This gear (44) would be placed so that it would provide for the turning handle (52) to be more nearly centered in the face of the cover plate (70). It would be so sized and situated as to turn either gear (40, or 42) and would be held on with an additional bolt (46) and possibly a nut (48). This additional gear (44) could be compression fitted to the new bolt (48). The blades (2+n) of the blind may be constructed of virtually any material. The only constraint being that it is self supporting when held upright. A variation of the basic solid blade (2) is illustrated by FIG. 15, which illustrates a hollow frame blade (54), optimally made of plastic, upon which a covering material (60) is placed. This is designed primarily as a means of providing for a translucent effect utilizing cloth. The material (60) may be appliqued to the frame, or as illustrated in FIG. 16, be forced into a slot (56) following the whole edge of the frame (54). The covering face plate (70) shall be held to the base unti (4) by usage of several spring rivets (74), (FIG. 20), preferably molded into the exterior side of the covering face plate.

While the above and herein mentioned blind with it's stated variations is the preferred form(s) of this invention, it has been described for purposes of illustration only in the stated form, and that various changes may be made hereunto within the range of the stated claims.

What is claimed is as follows:

1. A semi-circular shaped blind for an arched shaped window comprising:
    a plurality of blades, each said blade having a first end and a second end, an aperture disposed on the first end of each blade, a blade attachment means for interconnecting each blade to one another,
    a generally u-shaped base having a pivot bolt, said blades being disposed for rotational movement about said pivot bolt with said aperture of each blade having disposed there through said pivot bolt,
    means for maintaining said blades in various positions relative to said base so as to allow the blind to remain in a partially open or closed position,
    a track comprising a flexible material capable of being bent to a curve corresponding to the shape of said arch shaped window and defining a channel,
    a plurality of trolleys each comprising a glider disposed within said channel for movement therein and a flexible member having first and second ends with the first end connected to said glider and the second end connected to the second end of said blades, such that said track and said plurality of trolleys permit said blades to conform to the arch shaped window with a maximum of closeness.

2. A semi-circular shaped blind as defined in claim 1 wherein each said blade comprises a hollow frame having disposed thereon a covering material.

* * * * *